US008864101B1

(12) United States Patent  (10) Patent No.: US 8,864,101 B1
Buckner  (45) Date of Patent: Oct. 21, 2014

(54) MACHINE IMPLEMENTED UTILITY VALVE EXERCISING APPARATUS

(76) Inventor: Lynn A. Buckner, Chickamauga, GA (US)

( * ) Notice: Subject to any disclaimer, the term of this patent is extended or adjusted under 35 U.S.C. 154(b) by 494 days.

(21) Appl. No.: 13/199,902

(22) Filed: Sep. 13, 2011

Related U.S. Application Data

(60) Provisional application No. 61/403,363, filed on Sep. 14, 2010.

(51) Int. Cl.
*F16K 31/12* (2006.01)

(52) U.S. Cl.
USPC ............... 251/59; 251/28; 251/292; 137/899

(58) Field of Classification Search
CPC .. F16K 31/12; F16K 31/1635; F16K 31/0613
USPC .......... 137/899; 251/28, 30.01, 59, 291, 292; 91/275, 318; 60/383
See application file for complete search history.

(56) References Cited

U.S. PATENT DOCUMENTS

| | | | |
|---|---|---|---|
| 2,435,968 A * | 2/1948 | Kalix | 137/502 |
| 2,780,432 A * | 2/1957 | Shafer | 251/59 |
| 3,874,532 A * | 4/1975 | Metailler | 414/694 |
| 5,348,036 A * | 9/1994 | Oksanen et al. | 137/1 |
| 5,381,996 A * | 1/1995 | Arnemann et al. | 251/59 |
| 5,570,581 A * | 11/1996 | Preston | 60/483 |
| 5,810,051 A * | 9/1998 | Campagna et al. | 137/899 |
| 6,125,868 A * | 10/2000 | Murphy et al. | 137/1 |
| 7,334,606 B1 * | 2/2008 | Hurley | 137/899 |
| 7,376,529 B1 * | 5/2008 | Hurley | 702/113 |
| 7,604,023 B2 * | 10/2009 | Buckner et al. | 137/899.4 |
| 7,607,624 B1 * | 10/2009 | Hurley | 248/278.1 |
| 7,703,473 B1 * | 4/2010 | Hurley | 137/343 |
| 7,980,317 B1 * | 7/2011 | Preta et al. | 169/61 |
| 8,033,299 B2 * | 10/2011 | Buckner et al. | 137/899.4 |
| 8,365,838 B2 * | 2/2013 | Hurley | 173/185 |
| 8,387,664 B2 * | 3/2013 | Ferrar | 137/899 |

* cited by examiner

*Primary Examiner* — John Rivell
*Assistant Examiner* — Matthew W Jellett

(57) ABSTRACT

A method implemented by a valve operating apparatus for hands free exercising of an in ground utility valve, which may include repeatedly opening and closing the utility valve without requiring the use of a computer program or a physical human manipulation. A valve operating apparatus may include a bi directional hydraulic powered motor which may be coupled to a utility valve stem for the purpose of rotating the valve stem of the utility valve in a closing direction or an opening direction. The direction of rotation, of a hydraulic motor, may be reversed in response to detecting an opening of a preset pressure relief valve.

21 Claims, 11 Drawing Sheets

Side View

Cross Section

MACHINE IMPLEMENTED UTILITY VALVE EXERCISING APPARATUS

This application claims the benefits of provisional application No. 61/403,363 filed 14 Sep. 2010.

BACKGROUND OF THE INVENTION

1. Field of the Invention

The present invention relates to an apparatus and method for machine implementing a utility valve exercising event; wherein a "valve exercising event" is defined as a closing and opening of a utility valve with a valve exerciser; wherein a "valve exerciser" is defined as a hydraulic powered apparatus which will rotate a valve stem of a utility valve when the hydraulic powered apparatus is coupled to a valve stem of a utility valve.

A machine implemented, automated valve exercising apparatus may contain a pressurized fluid, a pressure relief valve (pressure regulator) a means for setting a pre determined fluid pressure; a means for detecting the achievement of a pre determined fluid pressure, wherein said means for detecting a pre determined fluid pressure is a sensor for detecting a pressure relief event (a fluid bypass event) by a pressure relief valve; wherein a pressure relief event is a pressure relief valve opening in order to relieve a fluid pressure by bypassing a volume of pressurized fluid. The sensor for detecting a pressure relief event may be a flow switch or a mechanical contactor switch which is activated by the opening of the pressure relief valve. When activated, the sensor for detecting a pressure relief event will signal and set into action a series of events which will cause a reversal of the direction of rotation of a utility valve stem. The signal from the sensor for detecting a pressure relief event may cause a directional control valve to reverse the flow of hydraulic fluid to a hydraulic motor which in turn will reverse the direction of rotation of the hydraulic motor which will in turn reverse the direction of rotation of a utility valve stem which is coupled to said hydraulic motor; thus automating the sequence of both opening and closing a utility valve without requiring the use of a computer program. The addition of counters, pressure sensors, flow sensors, timers, relays, displays, and data collection further automates the valve exercising event and the ability to document aspects of the valve exercising event.

2. Description of the Prior Art

Utility valves such as fire hydrant valves, water valves and gas valves will become non workable if they are not opened or closed on a frequent schedule. Typically a person will use a hand wrench to open or close a utility valve, or a hand held powered valve turner with a forward and reverse hand operated switch. A utility valve that has rusted up for years may require applying a predetermined pressure in a clock wise direction followed by applying a predetermined pressure in a counter clockwise direction. The sequence of flip flopping the direction of applied pressure needs to continue repeatedly until the valve operates freely between a full open and a full closed position, which may take an extended length of time, thus a need for the present invention, which is a hands free valve exerciser which is machine implemented and secured in place by an articulated boom arm.

SUMMARY OF THE INVENTION

The shortcomings and disadvantages of the prior art are overcome by the present invention.

The present invention includes a valve operating apparatus for hands free exercising of an in ground utility valve, which may include repeatedly opening and closing the utility valve without requiring the use of a computer program or a physical human manipulation. A valve operating apparatus may include a bi directional hydraulic powered motor which may be coupled to a utility valve stem for the purpose of rotating the valve stem of the utility valve in a valve closing direction or a valve opening direction. Opening and closing of the utility valve is considered "exercising a valve" or "valve exercising". Valve exercising helps insure the operability of a utility valve. A valve operating apparatus may be coupled with sensors and monitoring devices for detecting and recording the operability and mechanical condition of a utility valve and or its affect on the attached utility. The direction of rotation, of a hydraulic motor, may be reversed in response to detecting an opening of a preset pressure relief valve.

The opening of a preset or presetable pressure relief valve occurs when the pressure relief valve is placed in communication with a hydraulic fluid and the pressure of the hydraulic fluid exceeds the preset pressure of the pressure relief valve.

The pressure relief valve may also be known as a balancing valve because it uses a preset spring pressure to force the pressure relief valve close and uses the pressure of the hydraulic fluid against the pressure relief valve to force the pressure relief valve open. When the force of the hydraulic fluid pressure exceeds the force of the spring pressure then the pressure relief valve starts to open thus allowing a portion of the hydraulic fluid to flow through the pressure relief valve. A "pressure relief event" is when the hydraulic fluid flows through the pressure relief valve. Hydraulic fluid which flows through the pressure relief valve is generally piped back to the hydraulic fluid tank, thus the pressure relief valve is often called a bypass valve because it diverts or bypasses hydraulic fluid from its intended use and return it to the hydraulic fluid tank. The force of the spring pressure may be substituted with another presetable force such as air or liquid pressure, a pressurized cylinder, solenoid or the like.

An exercising event of a utility valve at least includes closing or opening a utility valve with a valve exerciser, wherein a valve exerciser at least includes a valve actuator being a rotation apparatus which is powered by a pressurized fluid. A machine implemented, automated valve exercising circuit contains a pressurized fluid, a pressure relief valve (pressure regulator) a means for setting a pre determined fluid pressure; a means for detecting the achievement of a pre determined fluid pressure, wherein said means for detecting a pre determined fluid pressure is a sensor for detecting a pressure relief event (a fluid bypass event) by a pressure relief valve, wherein a pressure relief event is a pressure relief valve opening in order to relieve a fluid pressure by bypassing a volume of pressurized fluid, wherein said sensor may be a flow switch; and means for reversing the direction of fluid flow, wherein said means for reversing a fluid flow may be a directional control valve. Reversing the direction of fluid flow also reverses the direction of rotation of the fluid powered rotation apparatus, thus automating the sequence of both opening and closing a utility valve. A pre determining counter may be used for stopping the valve exercising event after the valve has exercised freely during the full travel of a valve stem between full open to full close. The utility valve manufactures specifications may be used for determining how many times the valve stem of a utility valve must be rotated in order to travel from a full open to a full closed condition. Historical data collected and stored during past valve exercising events may be used for determining how many times the valve stem of a utility valve must be rotated in order to travel from a full open to a full closed condition. A pressure sensor in combination with a pre determining counter may be used for determining that a valve is operating freely during a full travel of a valve stem from full open to full close condition.

It is an object of the present invention to operate a valve turner hands free.

Another object of this invention is to position a fluid powered valve actuator on a utility valve that is a part of a pressurized water conduit or a pressurized gas conduit, and having the valve actuator open or close said utility valve on a routine bases for the purpose of insuring that the valve is operable.

Another object of the present invention is to have the fluid powered valve actuator rotate a valve stem of a utility valve by powering the valve actuator with fluid from the pressurized conduit which also contains the utility valve.

Another object of the present invention is to pre set a maximum automated valve exercising circuit fluid pressure in order to insure that a valve stem is not broken because of having too much pressure applied to it during a valve exercising event.

Another object of the present invention is to us a pressure relief valve or the like for pre setting a maximum fluid pressure which will be available to a fluid powered valve actuator.

Another object of the present invention is to provide a sensor which will detect a pressure relief event of a pressure relief valve or the like.

Another object of the present invention is to have a sensor, which detects a pressure relief event of a pressure regulator, send a signal to a rotation reversing controller which will reverse the direction of rotation of the valve actuator each time a pre determined fluid pressure is achieved.

Another object of the present invention is to couple a fluid powered motor shaft to the valve stem of a utility valve; apply a pre determined fluid pressure to the motor in a first direction; use a detection devise to determine reaching the pre determined fluid pressure; have the detection device activate a reversal of the flow of fluid to the motor thus applying a pre determined fluid pressure to the motor in a second direction.

Another object of the present invention is to have a machine implemented apparatus for repeatedly working a stuck utility valve stem in a forward and reverse rotation with a pre determined pressure until the valve stem travels freely from a full open position to a full closed position.

Another object of the present invention is to have a machine implemented apparatus for determining when a valve stem travels freely from a full open position to a full closed position.

Another object of the present invention is to have a machine implemented apparatus for stopping the valve exercising event after a utility valve stem travels freely from a full open position to a full closed position.

Another object of the present invention is to have a machine implemented apparatus for collecting, documenting and displaying a condition relative to a utility valve opening or closing event.

Another object of the present invention is to have a machine implemented apparatus for supporting and securing a fluid powered rotation apparatus relative to a valve stem of a utility valve.

Prominent features of the present invention have been broadly outlined above in order that the detailed description that follows may be understood. There are additional features of the invention that will be described hereinafter and which will form the subject matter of the claims appended hereto.

BRIEF DESCRIPTION OF THE DRAWINGS

FIG. 5 also has added features and control options.

DETAILED DESCRIPTION OF THE PREFERRED EMBODIMENTS

Using the drawings, illustrations of the present invention will now be explained.

Figure 1:
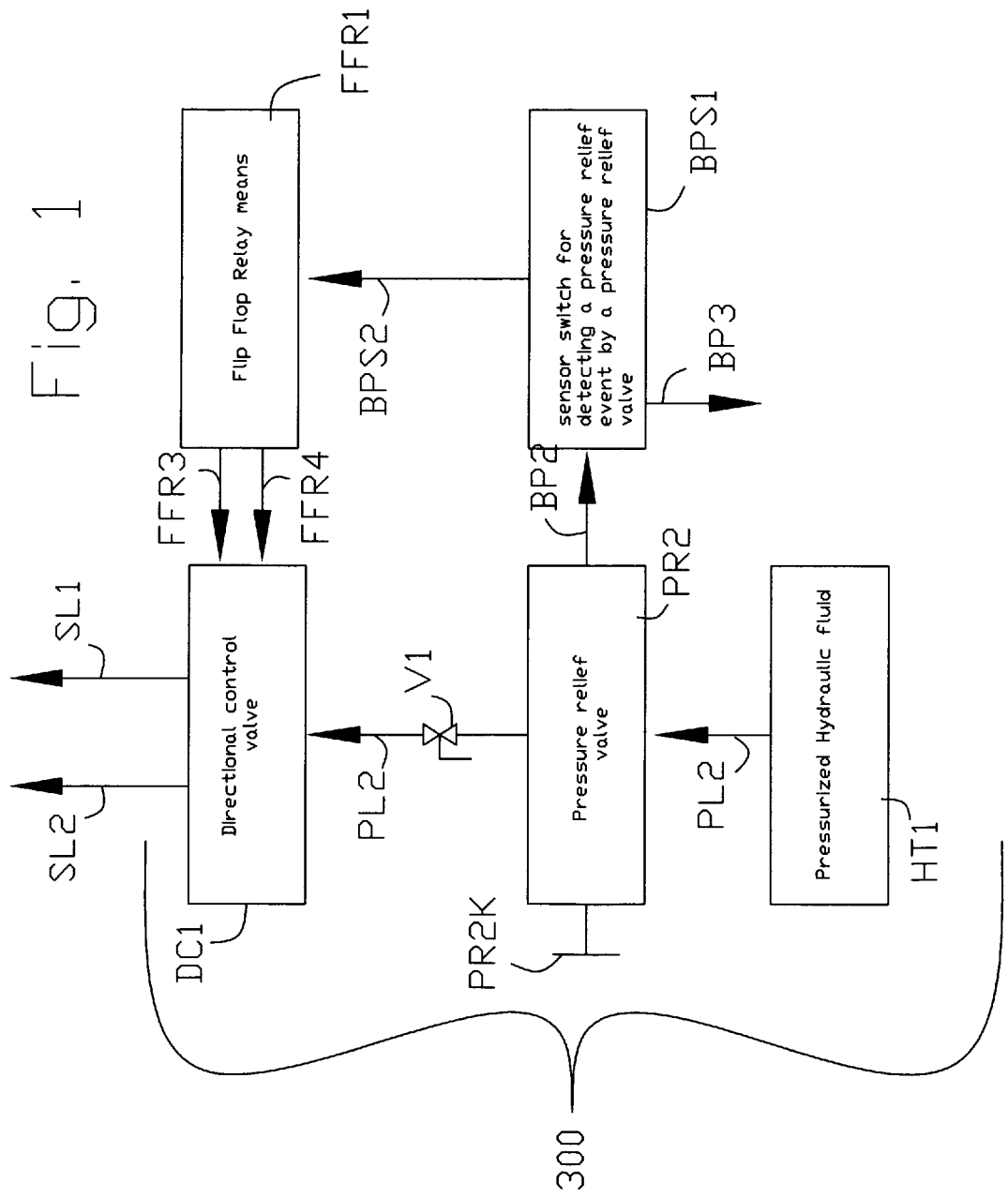
FIG. 1 is a flow chart in schematic diagrammatic form which illustrates the process of pre determining a pressure to be exerted on a fluid and then reversing the direction of flow of the fluid after achieving the pre determined fluid pressure.

FIG. 1 is a flow chart in schematic diagrammatic form which illustrates an apparatus and method for a machine implemented, automated valve exercising circuit 300 which contains a pressurized fluid HT1.

As illustrated in the drawings, a pressure relief valve PR2 (pressure regulator) includes a pressure adjustment means PR2K for setting a pre determined pressure for the hydraulic fluid HT1, wherein said pressure relief valve PR2 may insure that the pressurized hydraulic fluid HT1 does not exceed a predetermined pressure, wherein said pressure relief valve PR2 may bypass a volume of pressurized fluid HT1 if the pressure of the hydraulic fluid HT1 attempts to exceed the predetermined preset pressure which has been set by the pressure adjustment means PR2K.

A "pressure relief event" is the pressure relief valve PR2 opening in order to flow a volume of pressurized fluid HT1 through said pressure relief valve PR2. The hydraulic fluid HT1 that has passed through the pressure relief valve PR2, is generally flowed back to a hydraulic fluid tank HFT1. Thus a portion of the pressurized fluid HT1 which was intended to flow to a directional control valve DC1 has been bypassed back to the hydraulic fluid tank HFT1.

A "sensor switch" BPS1 is defined as a means for detecting a "pressure relief event" and activating a response; such as opening or closing an electrical contact or the like. The sensor switch BPS1 may be a flow switch positioned down stream of the pressure relief valve PR2 for the purpose of detecting a flow of hydraulic fluid HT1 as it flows from the pressure relief valve PR2; or the sensor switch BPS1 may consist of a contact switch mounted to the pressure relief valve PR2 in such as way as to activate a response when the pressure relief valve PR2 opens and creates a pressure relief event.

A hydraulic fluid HT1 may be supplied to the automated valve exercising circuit 300 at a pressure equal to or greater than the maximum pressure needed for operating a worst case scenario. The pressurized fluid HT1 flows from a pressurized fluid HT1 source and through a conduit PL2 in order to get to a pressure relief valve PR2. The pressure relief valve PR2 may also be a pressure regulator PR2. Typically a pressure relief valve PR2 uses a pressure adjustment means PR2K for pre setting a pressure relief pressure or bypass pressure. The pre set able pressure mean PR2K may be a tension spring with a screw and knob for increasing or decreasing a spring tension or pneumatic pressure of hydraulic pressure for push against a first side of a balancing valve PR2, which is the side that pushes the valve to a closed position. The pressurized fluid HT1 pushes against a second side of the balancing valve PR2, which is the side which pushes the valve open.

The pressure of the fluid HT1 is promotional to the energy required to rotate a motor HM1. Thus a valve actuator 32 motor HM1 will require increasing amounts of energy when coupled to a valve stem 99 which is in bad repair due to the lack of use or maintenance. Utility valve stem 99 is often times made of brass and will break when too much energy is applied during a valve exercising event. Thus, a need for an automated valve exercising circuit 300 which will repeatedly open and close a utility valve 98 until it works freely from a full open to a full closed to a full open position and the exercising event is accomplished at or below a pre set energy level which will not over stress the valve stem 99.

The pre set able pressure regulating means PR2 may be pre set to a pressure which is at or below an energy level which will not over stress a valve stem 99. The automated valve exercising circuit 300 will send pressurized fluid HT1 in a first direction to a valve actuator 32 motor HM1 which rotates a valve stem 99 in a first direction until the valve stem 99 reaches a point at which it will not further rotate, (either fully closed, open or stuck) thus the fluid HT1 pressure increases to the preset energy level and triggers the automated valve exer-cising circuit 300 to reverse the direction of fluid HT1 flow which in turn reverses the direction of rotation of the valve actuator 32 motor HM1 which rotates valve stem 99 in a second direction until it reaches a point at which it will not further rotate. This sequence of flip flopping between a first rotation direction and a second rotation direction may continue until it is determined that the valve stem 99 operates freely through a full range of travel from fully open to fully closed to fully open. By counting each rotation to a fraction of a rotation it is possible to determine a full range of travel from fully open to fully closed to fully open. A counter means VSC2 may be used in conjunction with a proximity switch VSC1 and a gear tooth T1 for the purpose of counting the rotations of a valve stem 99. One or more pressure sensors PS1 and PS2 may be used for measuring the energy required for rotating a valve stem 99. For example, in FIG. 5, the energy measured by sensor PS1 may be subtracted from the energy measured by sensor PS2 which will yield the energy used by motor HM1 during a rotation. A counter VSC2 may be coupled with a sensor PS1 and PS2 for the purpose of measuring an energy valve based on a rotation.

If the pressure exerted on fluid HT1 attempts to exceed a preset value, then a pressure relief event take place, which is when the pressure of fluid HT1 forces the pressure relief valve PR2 to open, thus relieving excess pressure by discharging a portion of the fluid HT1 from the pressurized conduit PL2 and through a bypass orifice BP2. The bypass orifice BP2 is often a conduit BP2 which leads back to the source of fluid HT1, which is often times a hydraulic tank HFT1.

A sensor means BPS1 may be used for detecting when a bypass event occurs. The sensor means BPS1 may be a flow switch BPS1 (such as an ST-6 flow switch by Suttner), which is activated upon detecting a flow of fluid HT1 through orifice BP2. The sensor means BPS1 may also be a pressure switch, a mechanical linkage between the balancing valve PR2 and a micro switch, an electrical conductivity meter, or the like. The fluid HT1 may leave the sensor BPS1 via conduit BP3. Thus as explained above, the definition for a sensor means BPS1 as used in this patent application is a "flow detection sensor" which detects a flow of hydraulic fluid HT1 flowing through the bypass orifice BP2 of a pressure relief valve PR2.

When sensor switch BPS1 detects a pressure relief event, the sensor switch BPS1 may send an out put signal BPS2 to a flip flop relay FFR1. The flip flop relay FFR1 may be a mechanical style such as a Tyco Electronics S89R11DAC112 or an electronic style such as a Cebek electronic I-9 or the like. The flip flop relay FFR1 typically has two switches or out put signals FFR3 and FFR4. The flip flop relay FFR1 alternates its out put signal between signal out put FFR3 and signal out put FFR4, thus only one of the two signals FFR3 or FFR4 are powered at any given time, thus the term "flip flop." Each time the input signal BPS2 stops and then starts again, the flip flop relay FFR1 changes its signal out put source FFR3 or FFR4. For example: flip flop relay FFR1 starts off with FFR3 having a closed relay for sending a signal and with FFR4 having an open relay for stopping a signal; then a first input signal BPS2 is sent to energize flip flop relay FFR1 which causes flip flop relay FFR1 to open contactor relay switch FFR3 which stops its signal, and closes contactor relay switch FFR4 which starts its signal; then the first signal BPS2 stops and a second input signal BPS2 is sent to reenergize flip flop relay FFR1 which causes flip flop relay FFR1 to close contactor relay switch FFR3 which starts its signal, and opens contactor relay switch FFR4 which stops its signal. Thus each time relay FFR1 is reenergized it flip flops its out put signal source between out put switch FFR3 and out put switch FFR4.

Figure 4:
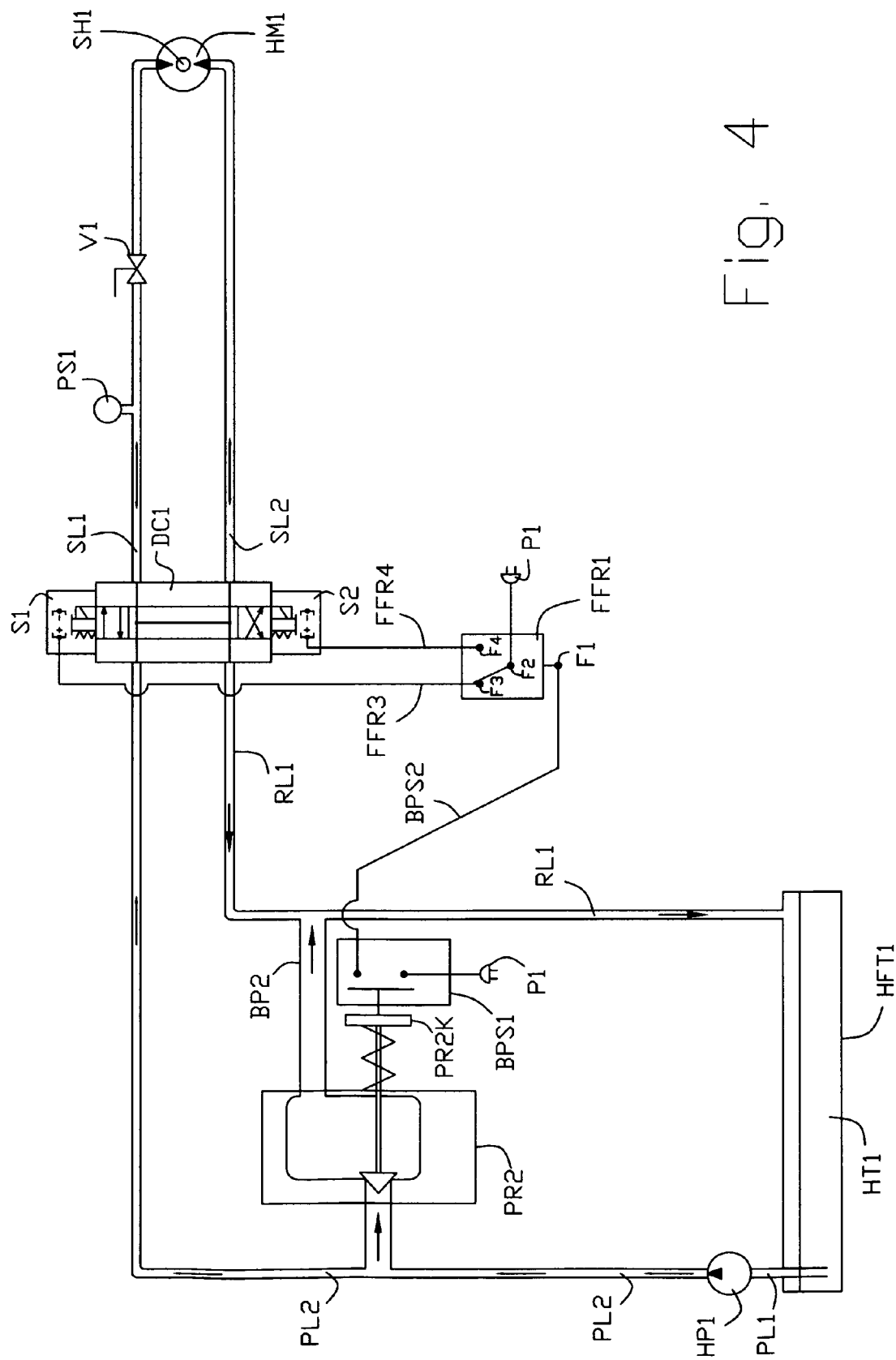
FIG. 4 is a flow chart which illustrates a sample arrangement for using a sensor switch attached to a pressure relief valve for activating a flip flow relay which in turn activates a directional control valve thus repeatedly reversing the direction of pressurized fluid flow to a hydraulic motor which in turn repeatedly reverses the direction of rotation of the hydraulic motor.

A directional control valve DC1 may be used for reversing the direction of fluid HT1 flow to a valve actuator 32 motor HM1. The directional control valve DC1 may have an open center spool which returns fluid HT1 back through conduit RL1 to its origin unless the directional control valve DC1 is energized for the purpose of dispensing fluid HT1 to a valve actuator 32 motor HM1. The directional control valve DC1 may dispense fluid in a first direction if solenoid S1 is powered or directional control valve DC 1 will dispense fluid in a second direction if solenoid S2 is energized. As illustrated in FIG. 4, a flip flop relay FFR1 determines which solenoid S1 or S2 will be energized. For example: if the flip flop relay FFR1 energizes its F3 switch then as signal FFR3 is sent to solenoid S1 which in turn causes directional control valve DC 1 to dispense a pressurized fluid HT1 in the direction of conduit SL1; but when the flip flop relay FFR1 energizes its F4 switch then a signal FFR4 is sent to solenoid S2 which in turn causes directional control valve DC1 to dispense a pressurized fluid HT1 in the direction of conduit SL2. In this illustration the direction or rotation of shaft SH1 is reversed each time a different solenoid S1 or S2 is energized. In FIG. 4, an electrical power P1 is illustrated as being supplied to contactor switch F2. Flip flop relay FFR1 is illustrated as having a coil F1 as a means for flip flopping between switches F3 and F4. Coil F1 is illustrated as being energized by a signal BPS2 which is illustrated as being powered by a flow switch BPS1 when a fluid HT1 is dispensed through conduit BP2 from a pressure relief valve PR2. Fluid HT1 is illustrated as being dispensed from flow switch BPS1 through a conduit BP3 which connects to a fluid HT1 return conduit RL1. In FIG. 4 a hydraulic pump HP1 is illustrated as receiving fluid HT1 through a conduit PL1 and then dispensing fluid HT1 under pressure into conduit PL2. The pressure relief valve PR2 is illustrated as having a knob and screw PR2K for pre setting a spring tension against the pressure relief balancing valve PR2.

Figure 2:
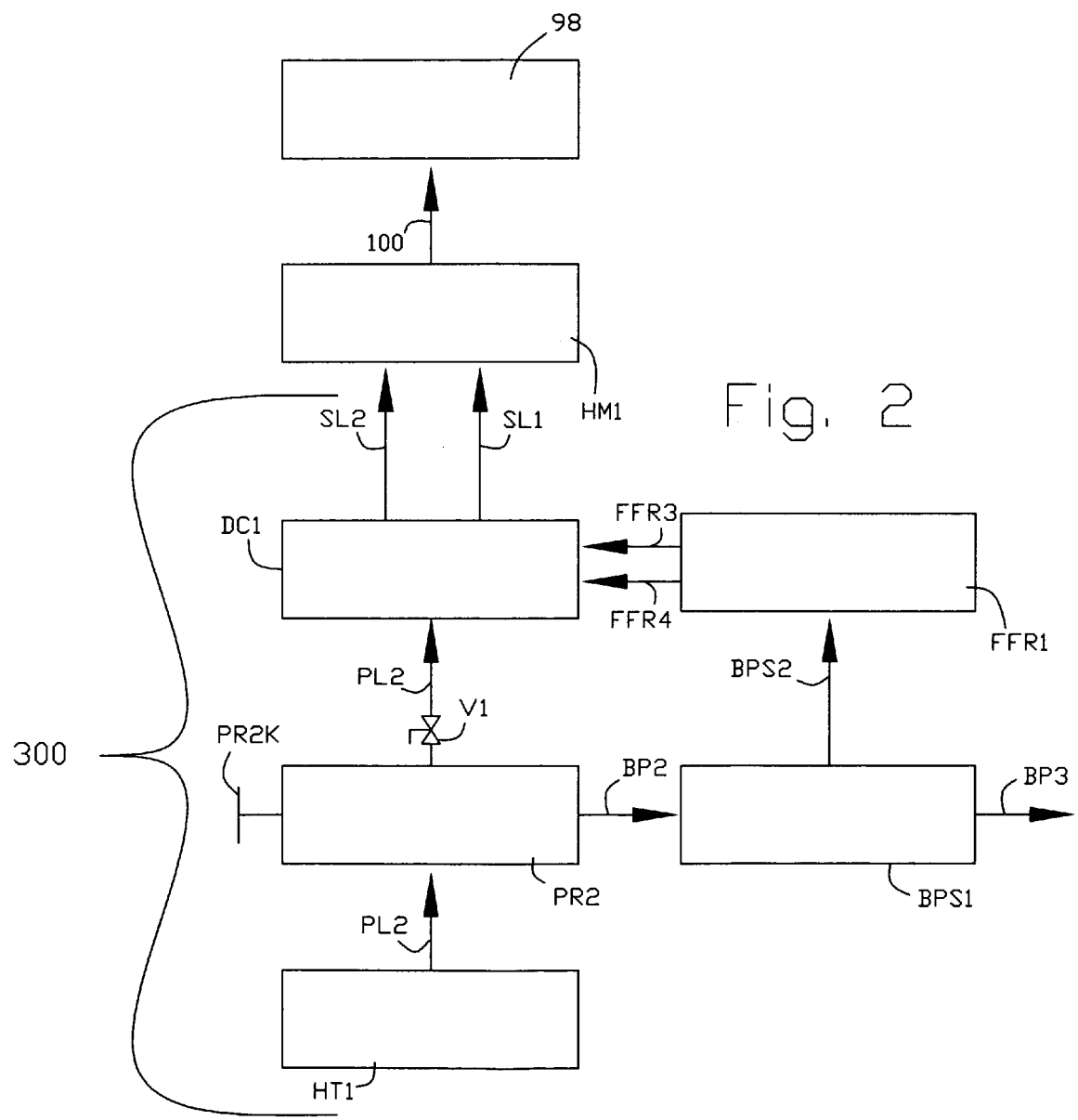
FIG. 2 is a flow chart in schematic diagrammatic form which illustrates using an automated valve exercising circuit for powering a rotation motor which has been coupled to a utility valve.

FIG. 2 is a flow chart in schematic diagrammatic form which illustrates using an automated valve exercising circuit 300 for powering a rotation motor HM1 which illustrates a coupling means 100 for coupling the motor HM1 to a utility valve 98.

Figure 3:
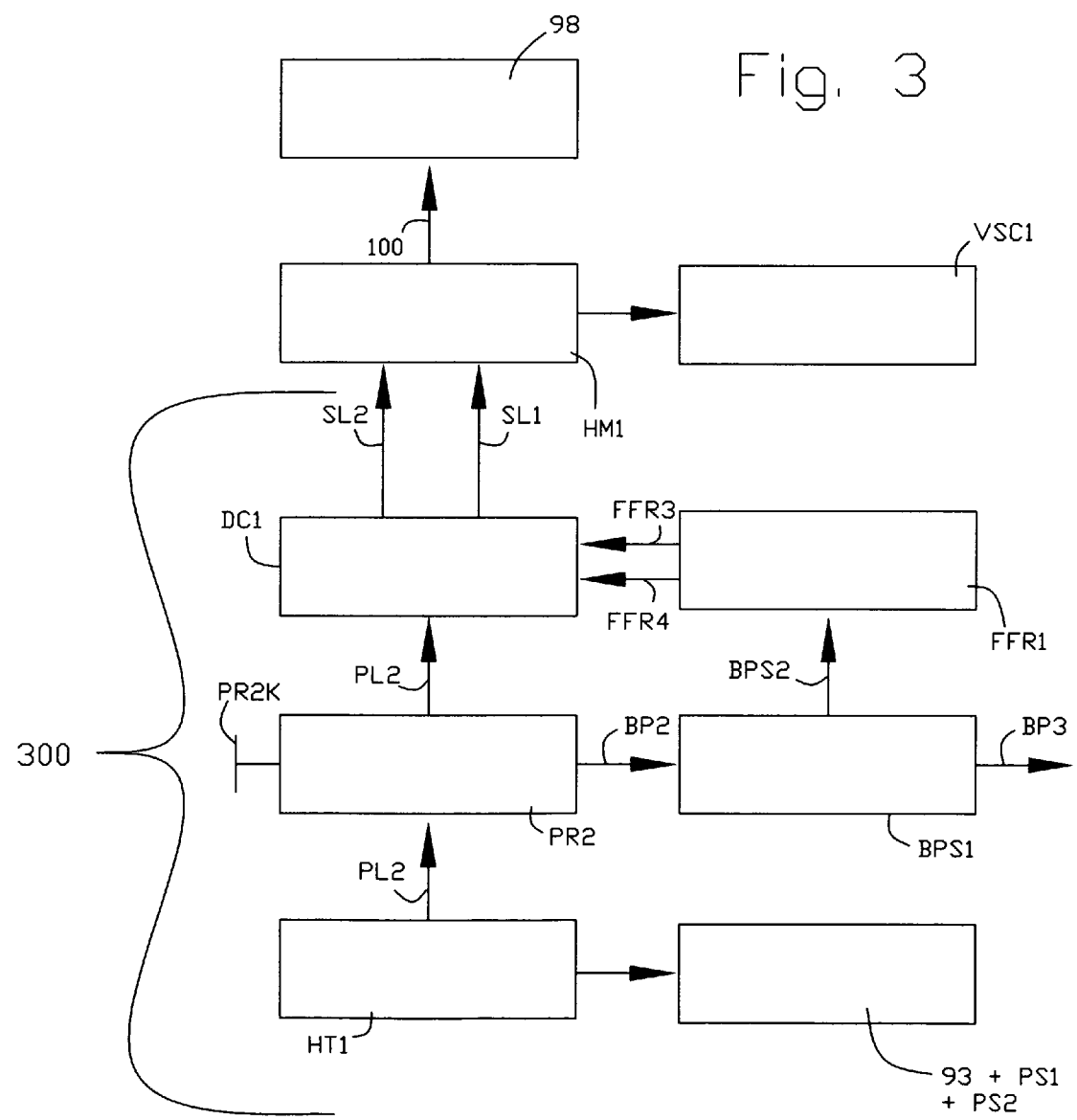
FIG. 3 is a flow chart in schematic diagrammatic form like FIG. 2, but with the addition of a counter for counting the rotations of a valve stem.

FIG. 3 is a flow chart in schematic diagrammatic form like FIG. 2, but with the addition of a counter VSC1 for counting the rotations of a valve stem 99 of a utility valve 98.

FIG. 4 is a flow chart which illustrates a sample arrangement for using the bypass switch BPS1 with a pressure relief valve PR2 and a flip flow relay FFR1 for controlling a directional control valve DC 1 and repeatedly reversing the direction of pressurized fluid HT1 flow to a hydraulic motor HM1 which in turn repeatedly reverses the direction of rotation of the shaft SH1.

A dead heading valve V1 may be placed in conduit SL1, SL2, PL2, PL3 or RL1. The dead heading valve V1 will be left open while powering the bi directional hydraulic motor HM1. The "dead heading valve" V1 is defined as a valve that, when closed, simulates placing full hydraulic fluid HT1 pressure to the bi directional hydraulic motor HM1.

A primary function of dead heading valve V1 is accomplished by closing valve V1 while setting a pre determined fluid HT1 pressure. Closing dead heading valve V1 stops the flow of fluid HT1 through its circuit which simulates a motor HM1 being in a stalled condition. Closing valve V1 is also known as dead heading the hydraulic system which triggers a pressure relief event by the pressure regulator PR2. During a dead heading event, a pressure regulator's PR2 pressure adjustment means PR2K may be pre set for the purpose of setting a pre determined fluid HT1 pressure. A pressure sensor PS1 may be used to verify a fluid HT1 pressure.

Figure 5:
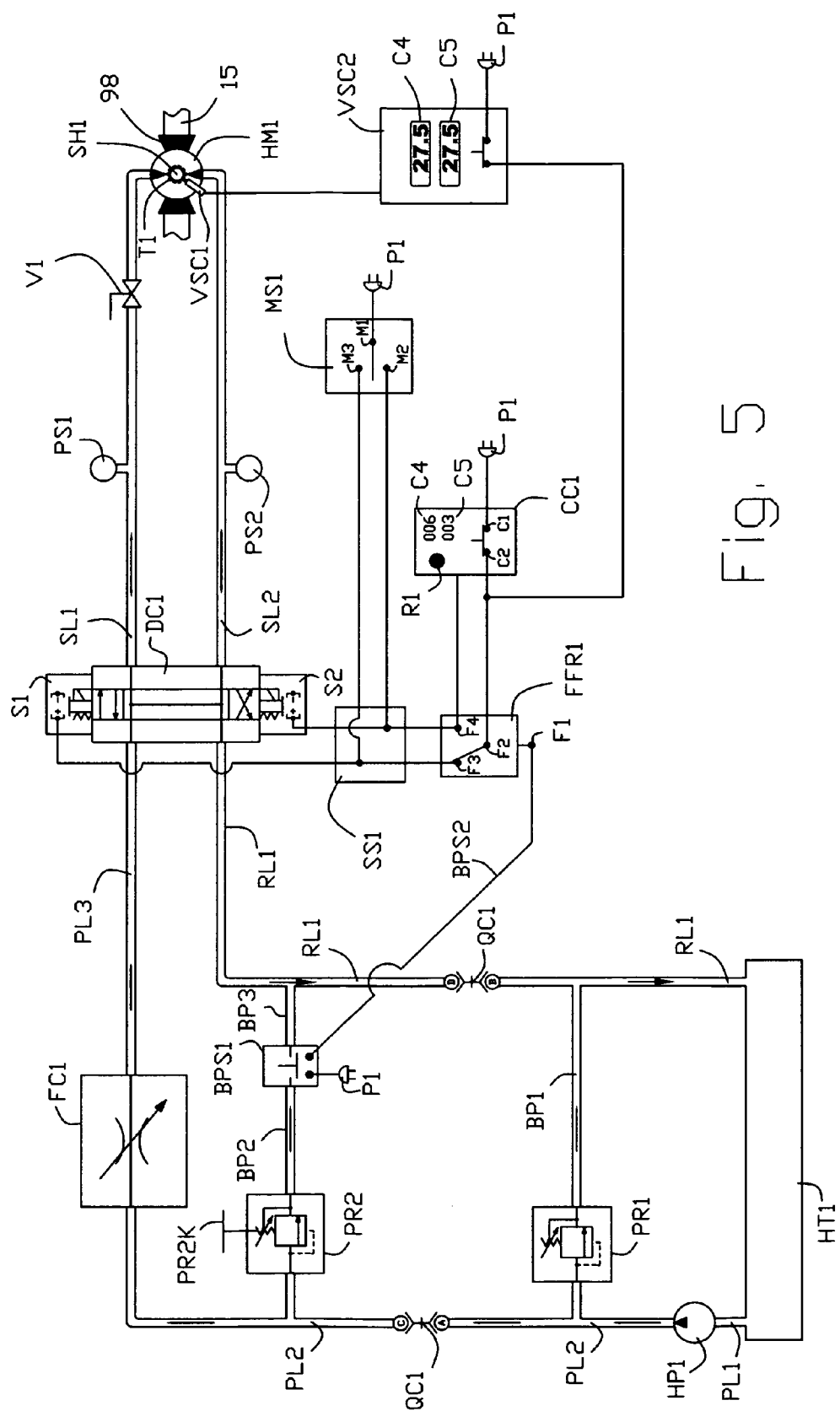
FIG. 5 is a flow chart similar to FIG. 4 which uses a flow switch sensor for detecting a pressure relief event.

FIG. 5. is a flow chart similar to FIG. 4 but with added features and control options such as a flow control valve FC1 which is illustrated as being placed in the conduit PL2 which supplies pressurized fluid HT1 to a directional control valve DC1. Conduit PL3 is illustrated as transporting the flow controlled fluid HT1 to the directional control valve DC 1. The flow control valve FC1 will also function as a means for controlling the rotation of a motor HM1 even if positioned in conduits SL1, SL2 or RL1.

A pressure relief valve PR1 is illustrated as being placed in conduit PL2 just after the hydraulic pump HP1 and dispenses its bypass fluid HT1 through conduit BP1. The pressure relief valve PR1 serves to establish the maximum available system pressure. Another pressure relief valve PR2 may be positioned down stream for the purpose of regulating task oriented operations.

Hydraulic hose lines such as conduits PL2 or RL1 may have quick connect fittings QC1 for temporally coupling a hydraulic circuit to a different tool which may be powered by the hydraulic circuit, and may also include a hose reel.

FIG. 5 illustrates the use of an automated valve exercising circuit 300 for controlling the utility valve exercising event.

FIG. 5 also illustrates its ability to select between the automated valve exercising circuit 300 and a manual operation of the utility valve exercising event. A selector switch SS1 is shown to represent the ability to select between use of an automated valve exercising circuit 300 and the use of a manual switch MS1. The manual switch MS1 allows an operator to toggle an OPEN-OFF-CLOSE switch MS1 in order to manually choose to open a valve 98 or close a valve 98 or stop turning the valve stem 99.

FIG. 5 also illustrates the use of a cycle counter CC1 for counting the number of times the automated valve exercising circuit 300 has completed a cycle or caused a valve 98 to be opened or closed. The cycle counter CC1 may also be a predetermining cycle counter CC1 for the purpose of choosing and setting a predetermined number of cycles one wishes to accomplish in a dial C4. The counter will count each cycle and display it in display C5. When the count in dial C4 matches the display C5 then a contact switch C2-C1 will open and stop powering the automated valve exercising circuit 300. A reset R1 may be used for resetting the event.

FIG. 5 also illustrates the use of a counter VSC2 for counting the rotations of a shaft SH1 which may be coupled to a valve stem 99. A gear tooth T1 may be positioned on shaft SH1. Each time the shaft SH1 rotates, the tooth T1 will pass by a switch VSC1. The proximity switch VSC1 in turn will send a signal to the rotation counter VSC2. In this way the counter VSC2 can count the rotations of shaft SH1. Switch VSC1 may be a proximity switch, a magnetic pick up or the like. The gear tooth TI may have 10 teeth which will allow the counter VSC2 to count the rotations of shaft SH1 to an accuracy of 1 tenth of a rotation. By using a manufacturers specifications or historical data from past utility valve exercising events, one may pre know the number of rotations which are required in order to rotate a valve stem 99 from a full open condition to a full closed condition. Counter VSC2 may be a predetermining counter VSC2. As a predetermining counter VSC2 a pre known number of rotations may be dialed into display C4. The counter VSC2 may display the measured rotations in display C5. When the rotation count displayed in display C5 matches the preset count of display C4 a contactor switch may activate. This contactor switch may be used for disconnecting power and stopping the automated valve exercising circuit 300. Again, a reset may be used with this operation as well.

Figure 5B:
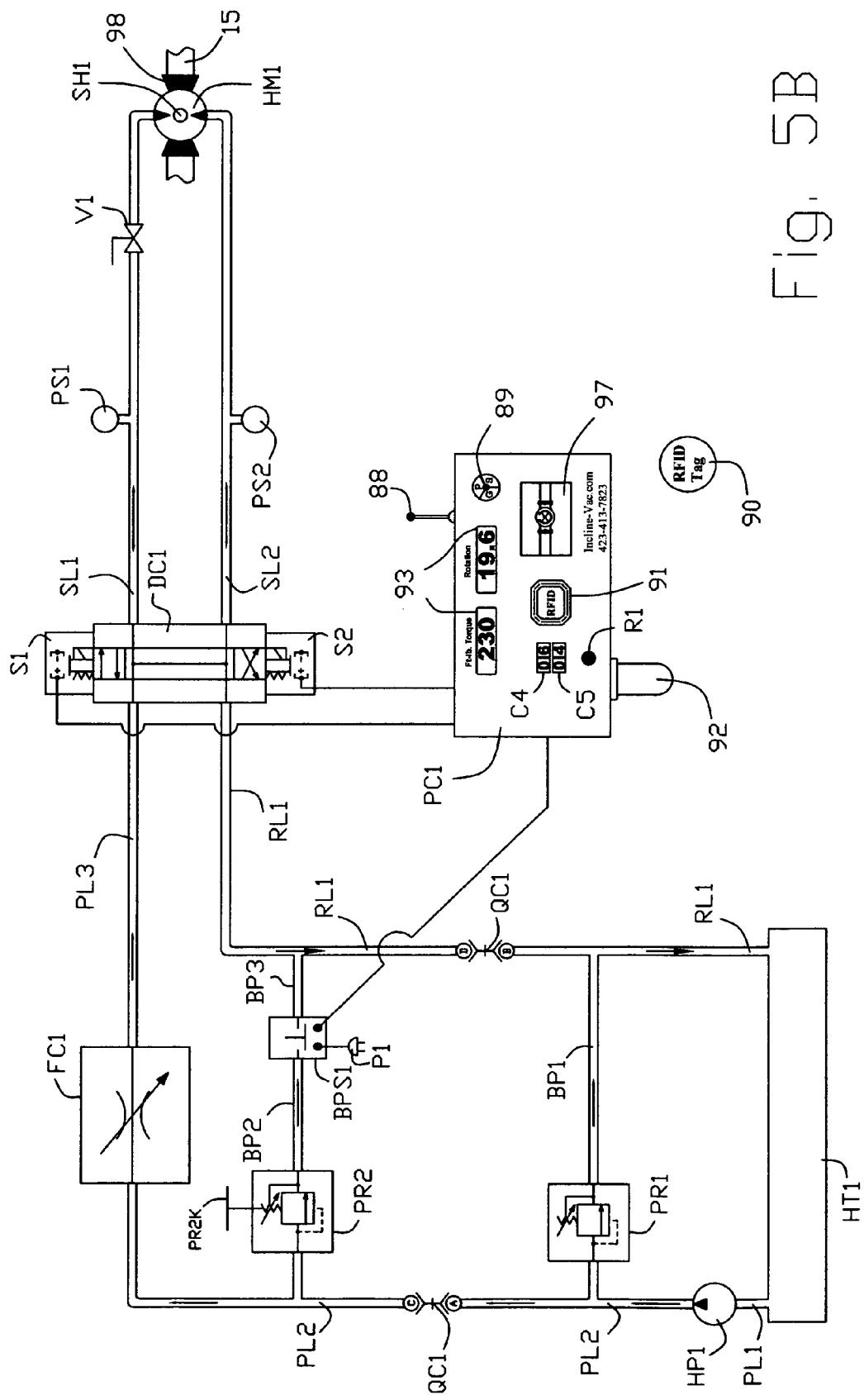
FIG. 5B is a flow chart similar to FIG. 5 but with yet more added features and control options.

FIG. 5B is a flow chart similar to FIG. 5 but with yet more added features such as a flash drive 92 for storing data which has been collected during a utility valve exercising event. The flash drive 92 may be a USB coupled device with a weather cover which may be easily remover for the purpose of removing the flash drive 98 so that data may be transported to a centralized data storage means.

An RFID 91 reader and an RFID tag 90 are illustrated as being a part of the electronic package for the purpose of identifying data; such as an operator having an RFID tag 90 may use the RFID tag for identifying himself and activate the system to function. When activated, the RFID 91 reader may sequentially activate such events a Global Positioning System means 89 which in turn may document a date, time, latitude, longitude, elevation, or the like. A screen display 97 may display information concerning GIS mapping information about a utility system. Displays 93 may show information relative to a rotation or a torque reading or a force or a pressure or a temperature or the like. Data may be transmitted wirelessly via a transmitter/receiver means 88.

Figure 6:
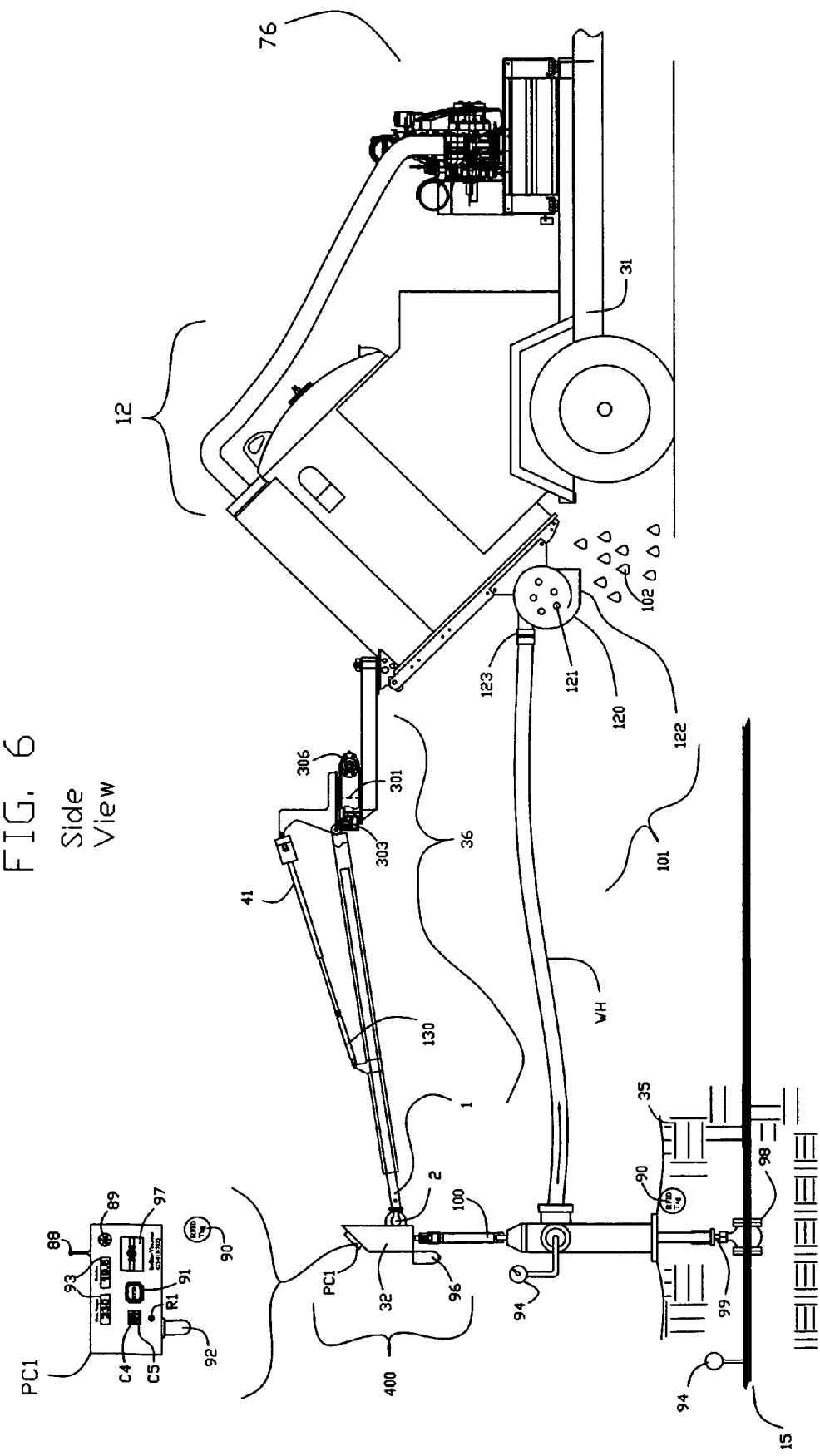
FIG. 6 is a side elevation view of a utility valve maintenance tool using a flow switch for detecting a pressure relief valve having a fluid relief event as it reacts a preset pressure and said flow switch in turn sending a signal from the flow switch to a flip flow relay for the purpose of activating the flip flow relay which in turn activates a directional control valve which repeatedly reverses the direction of a pressurized fluid flow to a hydraulic motor which in turn repeatedly reverses the direction of rotation of the hydraulic motor, which in turn rotates a valve stem of a utility valve thus opening and closing the utility valve. The utility valve maintenance apparatus simultaneously documents many conditions relative to the opening or closing of the utility valve. This repeated opening or closing of a utility valve helps insure the operability of the utility valve. The process of opening and closing a utility valve is known as exercising a valve and the apparatus used for opening or closing a utility valve is known as a valve exerciser.

FIG. 6 is a side view of a utility maintenance machine with a, power plant 76, a vacuum excavator 12, a fire hydrant tester 101, a valve exerciser 400, and an articulated boom means 36 shown as a means for supporting a valve exerciser 400 all mounted on a mobile platform 31. This machine can; excavate an access in the earth in order to access a utility valve 98; gather and document historical data relative to a previous valve 98 maintenance event; use its articulated boom means 36 for moving a valve exerciser 400 into a workable position relative to the valve 98, and then secure the valve exerciser 400 in a stable and secure position for the duration of a valve exercising event which may include opening or closing a valve 98 while collecting and storing data relative to the opening or closing event. The collected and stored data may include the date, time, operator identification, latitude, longitude, elevation, counting the number of rotations to open or close valve 98 and measuring the pressure and torque required to rotate a valve stem 99. The hydrant tester 101 may measure the flow of water exiting a hydrant, measure its residual water pressure and temperature as well as dissipate the water pressure before releasing it to the ground. De-chlorinator tablets may be placed inside a water diffuser 120 for the purpose of removing chlorine from the water before it is dispensed onto the ground.

The valve exerciser 400 may be coupled to the articulated boom means 36 via a ball 2 and socket 3 having means for tightening the socket 3 to the ball 2 and the ball 2 is illustrated as being mounted as part of a boom means 36 and the socket 3 is illustrated as being mounted as a part of a valve exerciser 400 which in this illustration is a powered valve actuator 32. The ball 2 and socket 3 serve as an attachment means for coupling a powered valve actuator 32 to a boom means 36 thus allowing the valve actuator 32 to have sufficient roll, pitch or yaw movement as needed in order to align said valve actuator 32 with the stem 99 of a valve 98. Although not illustrated in this drawing, the valve actuator 32 may be aligned with the fire hydrant side cap in order to use the powered valve actuator to loosen and remove the cap so that the sensor 94 may be screwed onto the side of the fire hydrant. The boom means 36 supports and positions the valve actuator 32 in proximity to the water utility 15 fire hydrant valve stem nut. Thus the ball 2 and socket 3 coupling means is novel and useful as part of the utility 15 maintenance and servicing process. FIG. 6 further illustrates a trailer 31 mounted vacuum excavator 12 having a boom means 36 attached. The boom means 36 includes a horizontal rotating pivot arm which allows the boom to operate on either side or from the back of the vacuum excavator 12. A linear actuator 41 illustrates the ability of the boom means 36 to have a powered vertically movable arm. The arm is also illustrates as being a telescoping arm which allows the reach of the arm to be varied. An air spring 130 is coupled with the linear actuator 41 which allows the vertical movement of the boom arm to have a counter balance quality. The boom may have a powered means 301 which will allow the boom arm 36 to be positioned and secured into a predetermined orientation. For example, a boom means 36 may be manually articulated into a predetermined orientation. Then a powered means 301 which may be a wheel hub with a disc break, or a powered brake, such as a model H220 disc brake caliper system made by Tolomatic, may be engaged in order to secure the orientation of said arm or said boom means 36. Or the boom means 36 may be moved to and secured in a predetermined orientation by a powered means 301 such as a slewing ring gear 303, which may be of the model S-9 hourglass worm slew ring gear drive type as made by Kinematics Mfg. Inc. or the like. The slewing ring gear 303 may have a rotation means 306 and said rotation means 306 may be a manual hand crank, a hydraulic motor, an electric motor, an air motor or the like. The powered means 301 can provide the ability to position and secure a powered valve actuator 32 relative to a utility valve 98. A coupling means 100 may be used for coupling the valve actuator 32 to the utility valve 98 which may be buried in the earth 35, thus the powered valve actuator 32 may open or close the utility valve 98 automatically without the aid a human to secure the position of the valve actuator 32 during said opening or closing event. The powered means 301 could also be a wheel hub with a disc brake, a solenoid stop, a cylinder, or a motor driving a gear or chain or belt drive.

The illustrated water utility 15 may be flow tested via a maintenance process which may includes a water hose for receiving water which is being flushed from a fire hydrant valve 98. The water hose delivers the water 102 to an inlet 123 of a water diffuser 120 which may have a perforated metal screen 122 over the outlet of the water diffuser. The perforated metal screen 122 may serve to further diffuse the water 102 thus reducing the erosion affect of the fire hydrant flushing water 102. The screen 122, may also serve to contain the De-Chlorinating chemical pellets within the water diffuser 120. The De-Chlorinating pellets 121 may serve to remove chlorine from the water thus making the water non toxic so that it is safe to discharge into a storm drain.

The utility maintenance apparatus may further includes sensors 94 and data gathering means PC1 for measuring, recording, storing and displaying data conditions relative to the utility maintenance event. Data conditions collected may include documenting the identity of a valve, the condition of a valve, it's location, who did the maintenance, when the service was performed, how the service affected the remainder of the utility system, what corrective maintenance needs to be accomplished and the assimilation of the collective data onto a utility mapping system or GIS program.

The mobile platform 31 is illustrated to have a power plant 76 which may have multiple utility servicing systems mounted on it which may include an engine, a vacuum pump, a blower, a water pump, a hydraulic pump, a generator, an air compressor, a welder and the like. Mobile platform 31 may also include a vacuum excavator system, a hydro excavation system, a water jetter system, and a pivot ably mounted articulated boom arm 36 with a utility valve actuator 32 mounted on it. In this example a valve actuator 32 is being used to exercise an in ground utility valve 98 via an extension rod attachment means 100 which is shown to couple the valve stem 99 to the powered valve actuator 32. The powered valve actuator 32 may be used to loosen valve seats, bolts or the like. Camera 96 is illustrated as collecting an image of the of the utility valve 98 maintenance event. The mobile platform 31 mounted systems are also illustrated to include process control and data condition documentation sensors 94 to measure the physical quantities of the service or repair operation. Sensors 94 may include a pressure sensor, a temperature sensor, a flow sensor or the like. A data logger 92, a digital display 93, an RFID 91 means, a camera 96, a GPS signal receiver 89, a utility mapping display 97 and wireless communication via antenna 88 are illustrated as being used for documenting, controlling, displaying and storing data related to the conditions of a utility servicing or repair operation or the like. A Process Control means PC1 is shown to give a person access to gather and control data and to monitor a maintenance servicing and repair event. Process Control means PC1 may at least be a rotation counter 93 which counts the rotations of the valve stem 99. As noted below, PC1 may also include many other functions. A person wishing to use the process controller PC1 may first activate the process controller PC1 by placing a personalized RFID tag 90 in proximity to a RFID reader 91. The process controller PC1 activation occurs when the person places his RFID tag 90 in communication with the RFID reader 91. The process controller PC1 will be activated provided that the persons RFID tag 90 is programmed to activate the system. In this way the PC1 is protected from persons not authorized to use or operate the process controller PC1. Use of the RFID tag 90 also documents personal data regarding who is using the system, what he used it for and for what period of time.

Figure 7:
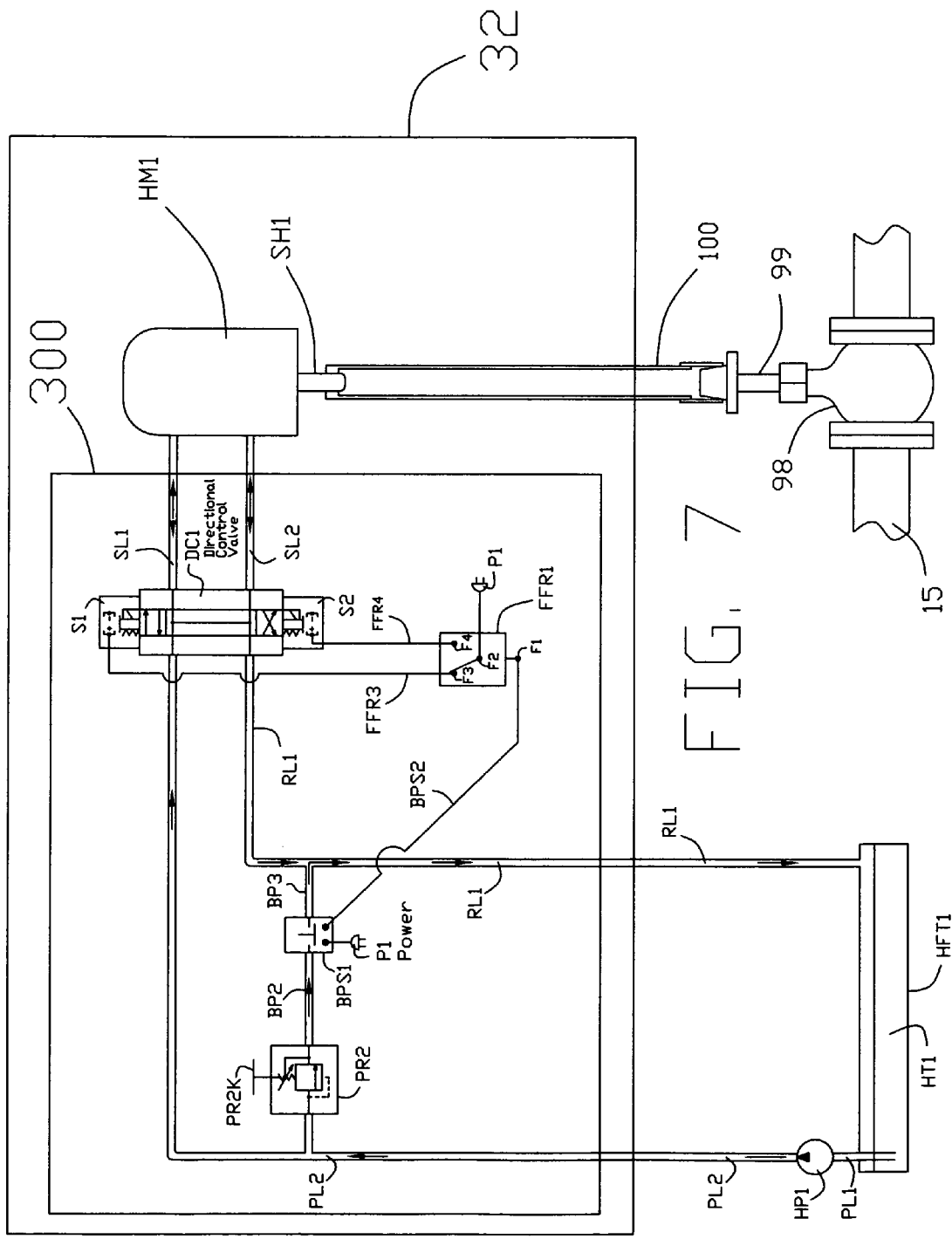
FIG. 7 is a flow diagram which illustrates a method of applying an automated valve exercising circuit 300 to a motor HM1 in order to achieve a machine implemented valve actuator 32 for exercising a utility valve 98.

FIG. 7 is a flow diagram which illustrates a method of applying an automated valve exercising circuit 300 to a motor HM1 in order to achieve a machine implemented valve actuator 32 for exercising a utility valve 98.

Figure 8:
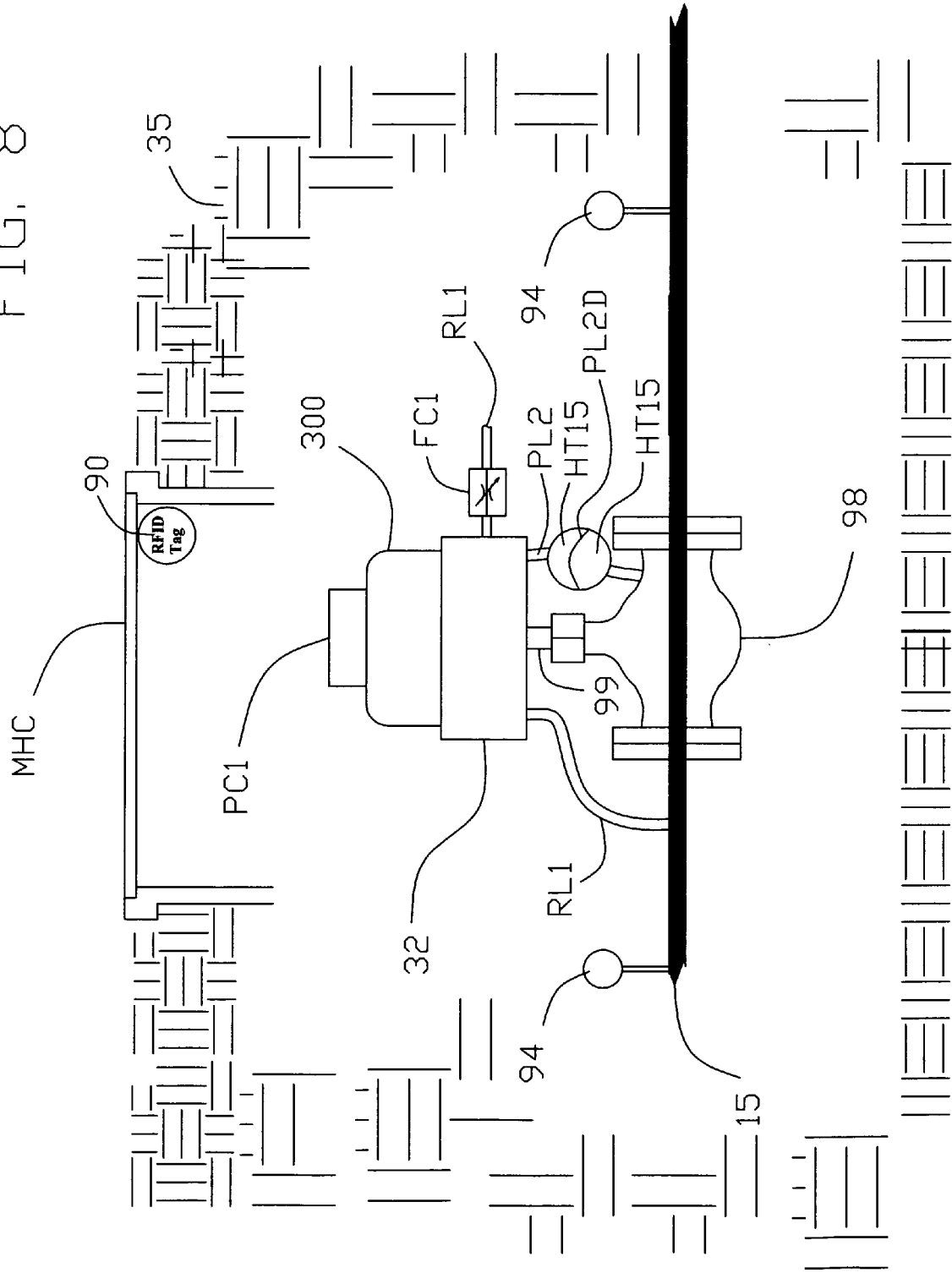
FIG. 8 is a side elevation which illustrates a pressurized utility having an isolation valve installed in the utility line. A valve actuator is illustrated as being attached to the utility valve stem of the utility valve for the purpose of exercising the utility valve on demand. The utility line is shown to contain a pressurized fluid such as water under pressure, gas under pressure or the like. The pressurized fluid is used to power the valve actuator. A diaphragm means illustrates a method for powering the valve actuator with out having the pressurized fluid come in contact with an automated valve exercising circuit.

FIG. 8 is a side elevation which illustrates a pressurized utility 15 having an isolation valve 98 installed in the utility line 15. A valve actuator 32 is illustrated as being attached to the utility valve stem 99 of the utility valve 98 for the purpose of exercising the utility valve 98 on demand. The utility line 15 is shown to contain a pressurized fluid HT15 such as water under pressure, gas under pressure or the like. The pressurized fluid HT15 is used to power the valve actuator 32. A diaphragm means PL2D illustrates a method for powering the valve actuator 32 without having the pressurized fluid HT15 come in contact with an automated valve exercising circuit 300. The diaphragm means PL2D serves to allow an energy source to be transferred from pressurized fluid HT15 to fluid HT1 while segregating fluid HT15 from fluid HT1. This allows fluid HT1 to be a non corrosive fluid in contact with the automated valve exercising circuit 300. The diaphragm means PL2D may include a conduit bulge and diaphragm such as a bladder tank or the like. This arrangement allows a utility valve 98 to be buried in ground along with a valve actuator 32 which includes an automated valve exercising circuit 300 and a process controller PC1. Thus, the valve 98 may be exercised on demand to insure its operability. A valve exercising event may be demanded by a remote wireless transmission to the PC1, or an internal timer may initiate the start of a valve exercising event, or a sensor which detects a maintenance condition may initiate a valve exercising event. The PC1 may collect, display and document conditions relative to the valve exercising event and may transmit said data to a central operations data base such as a GIS program. An RFID means 90 or 91 may be used for initiating or retrieving data.

Figure 9:
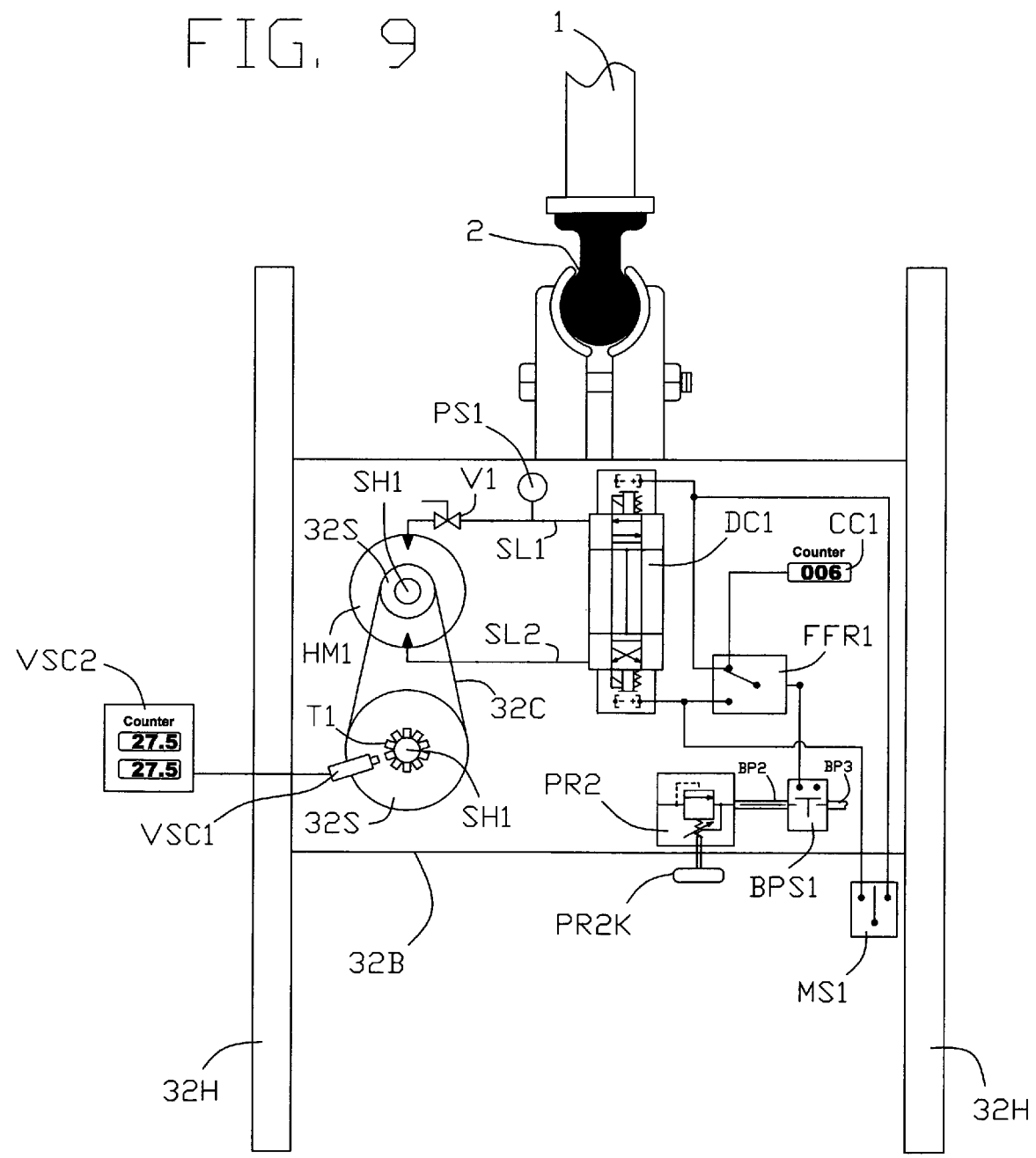
FIG. 9 is a plan view of a utility valve actuator using an automated valve exerciser circuit and a timer circuit for managing a valve exerciser.

FIG. 9 is a user friendly embodiment of a mobile valve exerciser 400 which may at least includes a valve actuator means 32, but may also include a process control means PC1. FIG. 9 is a plan view showing an example of how to arrange the valve actuator 32 on a mobile base 32B which in this example is coupled to a boom arm 1 via a ball coupler 2. The valve exerciser 400 mobile base 32B is shown to have handles 32H for use by an operator when operating the valve exerciser 400 in a manual mode. In this illustration the a manual reversing switch MS1 is shown as rocker type switch which the operator may easily operate with his thumb while still griping a handle 32H. The manual reversing switch is shown to bypass the automated flip flop relay circuit FFR1 and the pressure relief sensor switch BPS1, thus allowing an operator to manually select a direction he wishes the hydraulic motor HM1 to turn. The manual reversing switch MS1 is shown to be powering the directional control valve DC 1 solenoid, which in turn selects which direction a hydraulic fluid flows to the hydraulic motor HM1. In this illustration, the shaft SH1 of the hydraulic motor HM1 is shown to have a sprocket 32S attached. A chain 32C is shown to connect two sprockets 32S. This dual sprocket 32S arrangement allows the shaft SH1 of a hydraulic motor HM1 to drive a second shaft SH1. By selecting a diameter for each sprocket 32S a person may select a ration of power and or speed between a first shaft SH1 and a second shaft SH1. Either shaft SH1 may be used for coupling to a valve stem 99 for the purpose of rotating said valve stem 99. It is understood that the sprocket 32S may be substituted by a puller, gear or the like. The chain 32C may be substituted by a belt, series of gears or the like.

FIG. 9 also illustrates a valve V1 located in a hydraulic conduit, which could be either conduit SL1 or SL2. A purpose of valve V1 is to allow an operator to temporally close the valve V1 in order to simulate the hydraulic motor HM1 operating at a stalled condition; in other words, valve V1 stops the flow of fluid through the conduit circuit SL1 and SL2 thus causing a dead heading effect, which in turn causes a pressure relief valve PR2 to open in order to protect the hydraulic system from becoming over pressurized. During this dead heading event an operator may adjust the desired pressure at which the pressure relief valve PR2 will open. In this illustration, a pressure relief adjustment knob PR2K is shown as the means for adjusting the pressure at which the relief valve PR2 will open. A pressure sensor PS1 may be located in the hydraulic conduit circuit SL1 or SL2 for the purpose of identifying what hydraulic pressure is being applied to the hydraulic circuit SL1 or SL2. Thus by closing valve V1 an operator may then adjust the pressure relief adjustment knob PR2K in order to achieve a predetermined pressure value on the pressure sensor PSI. Valve V1 may be a manual valve or an automated valve, and the pressure relief adjustment knob PR2K may be substituted with an automated means of adjustment, and the pressure sensor PS1 may be a pressure dial, a pressure transducer or the like. The above described method of pre setting a maximum hydraulic operating pressure may be machine implemented. The above described technique for pre setting a maximum operating pressure for the hydraulic circuit SL1 or SL2 is use full for the purpose of insuring that the pressure applied to the hydraulic motor HM1 will be restricted to safe rotational force against a valve stem 99. By knowing the characteristics of a valve 98 and a valve stem 99, the operator may then pre set a maximum safe hydraulic pressure for the hydraulic circuit SL1 or SL2. The hydraulic circuit SL1 or SL2 are the supply and return hydraulic conduits for the hydraulic motor HM1. Depending on the clock wise or counter clockwise direction of rotation desired for the motor HM1 the direction of hydraulic fluid flow within conduit SL1 or SL2 will reverse direction.

After the pressure relief valve PR2 has been pre set, the valve V1 is opened so that the hydraulic fluid is free to flow through the hydraulic circuit SL1 and SL2 thus powering the hydraulic motor HM1. After the motor HM1 is coupled to a valve stem 99, the operator has a choice of opening or closing the valve 98 manually by using the manual selector switch MS1 or the operator may choose to let the machine implemented controls open and close the valve 98 automatically.

Figure 10:
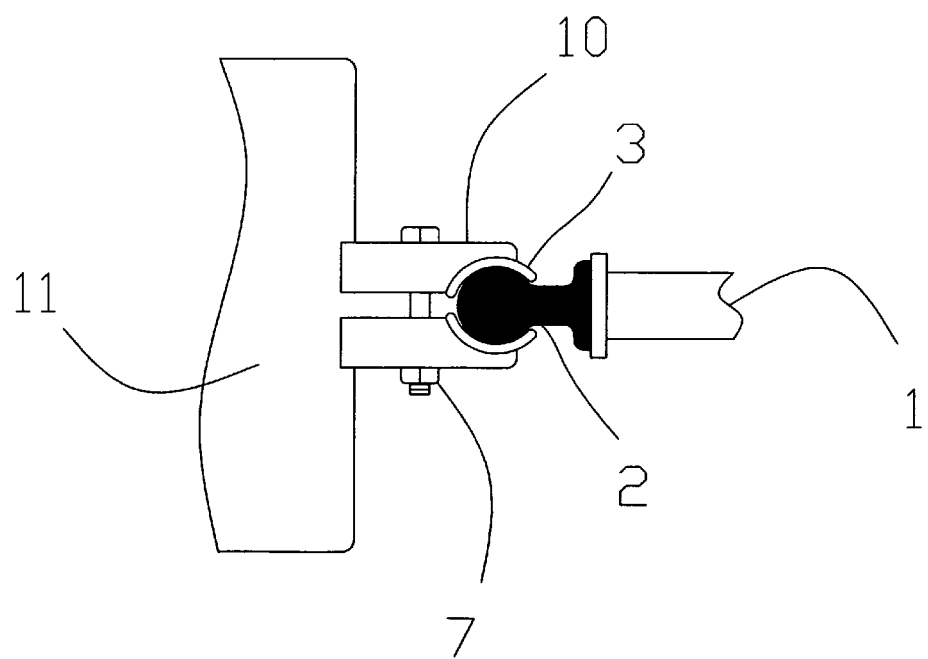
FIG. 10 is across section of a ball in socket method of attaching a valve exerciser to a boom arm.

FIG. 10 is a cross section top view of powered tool 11 coupled to a boom arm 1 via a ball 2 and socket 3. The ball 2 is illustrated as being attached to the boom arm 1 and the socket 3 is illustrated as being attached to the power tool 11. A support frame 10 is illustrated as a two part frame for attaching the power tool 11 to two socket segments 3 which are squeezed against the ball 2. A bolt 7 is illustrated as a means to tighten the two socket segments 3 against the ball 2. This arrangement allows the socket segments 3 to be tightened to a pre determined torque against the ball 2 in order to create a pre determined friction between the ball 2 and the socket 3, thus requiring a pre determined force to be applied to the ball 2 before roll, pitch or yaw movement of the ball 2 is accomplished. Although a bolt is illustrated as a means to tighten the socket segments to the ball, it is also an objective to use a strain gauge, cylinder or linear actuator to loosen or tighten the socket 3 against the ball 2 and to measure and accomplish a pre determined force. The socket segments 3 may also be loosened sufficient for the ball 2 to be removed from within the socket 3. The angular area of the ball 2 which is covered by the socket 3 may be pre determined so as to establish a pre determined range of roll, pitch or yaw. The socket 3 may be segmented into as many segments as needed to accomplish the specific attachment result. The socket 3 segments may be separate of each other or may be hinged together or hinged or attached to a common base.

The preceding description has been presented only to illustrate and describe an example of the invention. It is not intended to be exhaustive or to limit the invention to any precise form disclosed. Many modifications and variations are possible in light of the above teaching.

The illustrations were chosen and described in order to explain the principles of the invention and its practical application. The preceding description is intended to enable others skilled in the art to utilize the invention in various embodiments and with various modifications as are suited to the particular use contemplated. It is intended that the scope of the invention be defined by the following claims.

The invention claimed is:

1. A hydraulic powered apparatus for rotating the valve stem of a utility valve comprising:
a hydraulic motor for rotating said valve stem of said utility valve;
a pressurized hydraulic fluid for powering said hydraulic motor;
a directional control valve for reversing a direction of rotation of said hydraulic motor;
a pressure relief valve, and said pressure relief valve comprises a bypass orifice;
a flow sensor for detecting a flow of said hydraulic fluid through said bypass orifice wherein said directional control valve reverses said direction of rotation of said hydraulic motor in response to said flow sensor detecting said flow of said hydraulic fluid through said bypass orifice.

2. The apparatus according to claim 1, further comprising a dead heading valve for closing in order to activate a pressure relief event; an adjustment apparatus for setting a predetermined pressure at which said pressure relief value will pass said hydraulic fluid through said bypass orifice; whereby said maximum pressure of said pressurized hydraulic fluid may be adjusted to a predetermined value.

3. The apparatus according to claim 1, comprising a flip flop relay for relaying a signal from said flow sensor to said directional control valve, whereby said flip flop relay may, in response to said flow sensor, send a signal to said flow control valve to reverse the direction of flow of said pressurized hydraulic fluid to said hydraulic motor, thus reversing said direction of rotation of said valve stem.

4. The apparatus according to claim 1, comprising a pre determining counter for counting how many times said directional control valve has reversed said direction of rotation of said valve stem; wherein said pre determining counter initiates the stopping of rotation of said valve stem; whereby said hydraulic powered apparatus for rotating the valve stem of said utility valve is a hands free apparatus for rotating said valve stem of said utility valve.

5. The apparatus according to claim 1, comprising an RFID for activating data collection.

6. The apparatus according to claim 1, comprising a vacuum excavator for vacuuming an access to said valve stem of said utility valve.

7. The apparatus according to claim 1, comprising a GPS signal receiver for documenting a location and time.

8. The apparatus according to claim 1, and further comprising a data logger for documenting at least one condition relative to a rotation of said valve stem.

9. The apparatus according to claim 1, and further comprising a support for positioning said hydraulic motor adjacent to said valve stem.

10. The apparatus according to claim 1, and further comprising an articulated boom arm for positioning said hydraulic motor adjacent to said valve stem, and further comprising a coupler for attaching said hydraulic motor to said valve stem; wherein said articulated boom arm further comprises a brake for securing the position of said hydraulic motor during a utility valve exercising event.

11. The apparatus according to claim 1, and further comprising an articulated boom arm for positioning said hydraulic motor relative to said valve stem, wherein said articulated boom arm further comprises a powered slewing ring gear for articulating and securing the location of said hydraulic motor during said utility valve closing or opening event.

12. The apparatus according to claim 1, wherein said utility valve is installed as a part of a conduit which contains a pressurized fluid, and said pressurized fluid from said conduit is used for the purpose of powering said hydraulic motor.

13. An apparatus for reversing a direction of rotation of a hydraulic motor in response to a flow sensor detecting a flow of hydraulic fluid through a bypass orifice of a pressure relief valve; and said apparatus comprising: said hydraulic motor; a pressurized hydraulic fluid for powering said hydraulic motor; a directional control valve for reversing a direction of flow of said hydraulic fluid to said hydraulic motor; said pressure relief valve, and said pressure relief valve comprising said bypass orifice for flowing a portion of said hydraulic fluid when a predetermined hydraulic pressure is achieved; said flow sensor for detecting that said flow of hydraulic fluid being flown through said bypass orifice; wherein said flow sensor initiates a change in the direction of rotation of said hydraulic motor; whereby said apparatus may reverse the direction of rotation of said hydraulic motor in response to a pressure relief event.

14. The apparatus according to claim 13, and further comprising a support for positioning said hydraulic motor adjacent to a valve stem of a utility valve, and further comprising a coupler for attaching said hydraulic motor to said valve stem; and further comprising a data logger for documenting at least one condition relative to a rotation of said valve stem; whereby said apparatus may automatically and repeatedly open and close said utility valve hands free.

15. A hands free method for exercising a utility valve, comprising:
    the step of detecting a flow of hydraulic fluid through a bypass orifice of a pressure relief valve;
    the step of reversing a direction of rotation of a hydraulic motor in response to detecting said flow of said hydraulic fluid through said bypass orifice;
    whereby said utility valve can be repeatedly opened and closed thus exercising said utility valve hands free.

16. The method according to claim 15, and further comprising;
    the step of coupling said hydraulic motor to a valve stem of said utility valve;
    the step of counting a rotation of said valve stem.

17. The method according to claim 15, and further comprising;
    the step of counting the number of times said direction of rotation is reversed and further comprising the step of stopping said rotation of said hydraulic motor in response to counting a pre determined number of times said direction of rotation has been reversed.

18. The method according to claim 15 and further comprising; the step of documenting data which is relative to the rotation of a valve stem of said utility valve.

19. The method according to claim 15 and further comprising; the step of vacuuming an access to a valve stem of said utility valve.

20. The method according to claim 15 and further comprising the step of setting a pre determined pressure at which said pressure relief valve will flow hydraulic fluid through a bypass orifice; and further comprising the step of supporting said hydraulic motor adjacent to a valve stem of said utility valve; and further comprising the step of coupling said hydraulic motor to said valve stem.

21. The apparatus according to claim 13 comprising a vacuum excavator for vacuuming an access to a valve stem of a utility valve.

* * * * *